US009885253B2

(12) United States Patent
Soria et al.

(10) Patent No.: US 9,885,253 B2
(45) Date of Patent: Feb. 6, 2018

(54) HYBRID INNER FIXED STRUCTURE WITH METALLIC AND COMPOSITE CONSTRUCTION

(71) Applicant: Rohr, Inc., Chula Vista, CA (US)

(72) Inventors: Christian Soria, La Mesa, CA (US); Jihad Ramlaoui, Chula Vista, CA (US); Alan J. Binks, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 406 days.

(21) Appl. No.: 14/508,637

(22) Filed: Oct. 7, 2014

(65) Prior Publication Data

US 2015/0098810 A1    Apr. 9, 2015

Related U.S. Application Data

(60) Provisional application No. 61/887,858, filed on Oct. 7, 2013.

(51) Int. Cl.
| | |
|---|---|
| *F01D 25/28* | (2006.01) |
| *F01D 25/00* | (2006.01) |
| *F01D 25/24* | (2006.01) |
| *F02K 1/72* | (2006.01) |
| *F02K 1/82* | (2006.01) |
| *B64D 29/06* | (2006.01) |
| *B64D 27/26* | (2006.01) |

(52) U.S. Cl.
CPC ............. *F01D 25/28* (2013.01); *B64D 29/06* (2013.01); *F01D 25/005* (2013.01); *F01D 25/24* (2013.01); *F02K 1/72* (2013.01); *F02K 1/822* (2013.01); *B64D 2027/264* (2013.01); *Y02T 50/672* (2013.01); *Y02T 50/675* (2013.01)

(58) Field of Classification Search
CPC ........ F01D 25/28; F01D 25/005; F01D 25/24; B64D 29/06; B64D 2027/264; F02K 1/72; F02K 1/822
USPC .......................................................... 415/126
See application file for complete search history.

(56) References Cited

U.S. PATENT DOCUMENTS

| | | |
|---|---|---|
| 4,044,973 A | 8/1977 | Moorehead |
| 4,826,106 A | 5/1989 | Anderson |
| 5,083,426 A | 1/1992 | Layland |
| 5,136,839 A | 8/1992 | Armstrong |
| 5,239,822 A | 8/1993 | Buchacher |
| 7,526,921 B2 | 5/2009 | Williams et al. |
| 8,109,466 B2 | 2/2012 | Aten et al. |
| 8,172,176 B2 | 5/2012 | Welch |

(Continued)

OTHER PUBLICATIONS

Victor Birman, "Modeling and Analysis of Functionally Graded Materials and Structures", Applied Mechanics Reviews, vol. 60, pp. 195-216, ASME, Sep. 2007, downloaded from <http://www.ewp.rpi.edu/hartford/~ernesto/F2011/EP/MaterialsforStudents/Saunders/modeling%26analysis.pdf>.

(Continued)

*Primary Examiner* — Aaron R Eastman
(74) *Attorney, Agent, or Firm* — O'Shea Getz P.C.

(57) ABSTRACT

Aspects of the disclosure are directed to a system for an aircraft comprising: a titanium bottle section that includes at least two sections configured to house an engine, and at least one bifurcation panel coupled to the bottle section, wherein the at least one bifurcation panel includes a material that is different from titanium.

20 Claims, 14 Drawing Sheets

(56) References Cited

U.S. PATENT DOCUMENTS

| | | | | |
|---|---|---|---|---|
| 2006/0218934 | A1* | 10/2006 | Williams | B64D 41/00 |
| | | | | 60/785 |
| 2009/0184198 | A1* | 7/2009 | Balk | B64D 27/18 |
| | | | | 244/54 |
| 2010/0229528 | A1* | 9/2010 | Ramlaoui | F02K 1/09 |
| | | | | 60/226.2 |
| 2010/0260602 | A1* | 10/2010 | Binks | B64D 29/08 |
| | | | | 415/214.1 |
| 2011/0154831 | A1* | 6/2011 | Journade | B64D 27/26 |
| | | | | 60/797 |
| 2011/0167785 | A1 | 7/2011 | Moore et al. | |
| 2011/0318173 | A1* | 12/2011 | Ramlaoui | B64D 29/06 |
| | | | | 415/182.1 |
| 2013/0084174 | A1* | 4/2013 | Maalouf | F01D 25/246 |
| | | | | 415/208.1 |
| 2013/0118599 | A1* | 5/2013 | James | B64D 29/00 |
| | | | | 137/15.1 |
| 2013/0129483 | A1 | 5/2013 | Chiou | |
| 2013/0230391 | A1 | 9/2013 | Hurlin | |
| 2014/0030087 | A1 | 1/2014 | Soria | |

OTHER PUBLICATIONS

John M. Welch, "A Perspective on MRO Trends in Advanced Material Repair", Aviation Week and Space Technology MRO Europe Conference ExCel Exhibition and Conference Centre, London, UK, Sep. 24, 2013, downloaded from <http://events.aviationweek.com/html/meu13/24SEPT_COMPOSITES_SESSION1_JOHN_WELCH.pdf>.

Chinese office action for CN201480055361.4 dated Feb. 24, 2017.

* cited by examiner

HYBRID INNER FIXED STRUCTURE WITH METALLIC AND COMPOSITE CONSTRUCTION

CROSS-REFERENCE TO RELATED APPLICATIONS

This application claims the benefit of U.S. Provisional Application No. 61/887,858, filed Oct. 7, 2013.

TECHNICAL FIELD

Aspects of the disclosure are directed to nacelle systems for turbofan propulsion systems for aircraft, and more specifically thrust reverser inner fixed structures.

BACKGROUND

A turbofan propulsion engine for aircraft includes a gas turbine engine core that powers a turbofan. The air moved by the fan flows in a bypass air duct formed annularly around the engine core. A nacelle system includes all the structure that defines the bypass air duct, the inlet to the fan and engine, and the exhaust nozzles for the bypass air in the bypass air duct and the exhaust from the core engine. A schematic representation of typical nacelle components is shown in FIG. 1.

The inside surface of the fan duct is formed by structure typically termed the inner fixed structure by those skilled in this art. The inner fixed structure (IFS) is typically fashioned in two halves which join together, one of the halves of a typical IFS is shown in FIG. 2. The inside surface of the IFS faces the engine core and helps define a chamber around the engine core to protect it and to separate any fire which might break out around the engine core from escaping and spreading to other areas of the nacelle. The outer surface of the IFS faces the bypass air duct and must be smooth to minimize drag. The inside surface of the IFS may be exposed to extremely high temperatures radiating from the operating engine core and must be capable of withstanding those temperatures while remaining structurally sound. The outside surface of the IFS is very effectively cooled by the fast flow of ambient air in the bypass air duct. This means that a wide temperature gradient typically exists between the inside and outside surface of the IFS, which can present many challenges that are addressed through material selection and design.

To minimize the temperature gradient, and to minimize the maximum temperature that the IFS material will be exposed to, it is common to cover the inside surface of the IFS with a protective heat blanket. The protective heat blanket is a separately formed component which is attached to discreet locations to the inside surface of the IFS. The protective blankets are fashioned as thin, flexible sheets with outer skins of titanium or stainless steel or other heat resistant metal. The sheets can be molded around the complexly curved surfaces of the IFS and around components, wires or tubes protruding through. The heat blankets, sometimes along with designed cooling flows of air from the bypass air duct, are effective enough in reducing the temperature of the inner surface of the IFS such that the IFS can typically be made from a carbon fiber reinforced composite material, which is a desirable material for its light weight.

Heat blankets themselves, however, add weight and size to the nacelle. The heat blanket may require the inner surface of the IFS to be radially spaced up to an inch or more further from the engine core case. This extra inch means that the overall nacelle system will be larger in diameter, which can significantly add to the weight and drag of the nacelle. Also, the heat blankets are expensive, add extra time for installation, are sometimes not as reliable as desired, and are difficult to work with when removing or repairing any portion of the IFS during service.

It is desired to have an IFS which does not require heat blankets, but remains lightweight and meets the structural and temperature requirements.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system for an aircraft comprising: a titanium bottle section that includes at least two sections configured to house an engine, and at least one bifurcation panel coupled to the bottle section, wherein the at least one bifurcation panel includes a material that is different from titanium. In some embodiments, the system comprises at least one v-blade configured to couple the bottle section and the engine at a forward end of the engine. In some embodiments, the system comprises one of: at least one standoff configured to couple the bottle section and the engine at an aft end of the engine, and at least a second v-blade configured to couple the bottle section and the engine at the aft end of the engine. In some embodiments, the system comprises at least one beam coupled to the at least one bifurcation panel. In some embodiments, the at least one beam is integral with the at least one bifurcation panel. In some embodiments, the at least one beam is a hinge beam. In some embodiments, the system comprises a duct wall configured as a single piece that is translatable in at least one of a forward direction or an aft direction. In some embodiments, the system comprises a pylon coupled to the at least one bifurcation panel and integral with the at least one bifurcation panel. In some embodiments, the titanium bottle section is two sections that form a 360° barrel shape when coupled to one another. In some embodiments, the titanium bottle section is at least three sections that form a 360° barrel shape when coupled to one another. In some embodiments, a first of the at least three sections is configured to couple to a pylon. In some embodiments, the first of the at least three sections is configured to pass at least one of a duct, a wire, a harness, a tube, and an engine support structure. In some embodiments, the at least one bifurcation panel is located within a span of a first of the at least three sections. In some embodiments, the at least one bifurcation panel is attached to the bottle section. In some embodiments, the at least one bifurcation panel includes a composite material. In some embodiments, the bottle section is configured to transfer loads generated by the engine axially along the bottle section.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
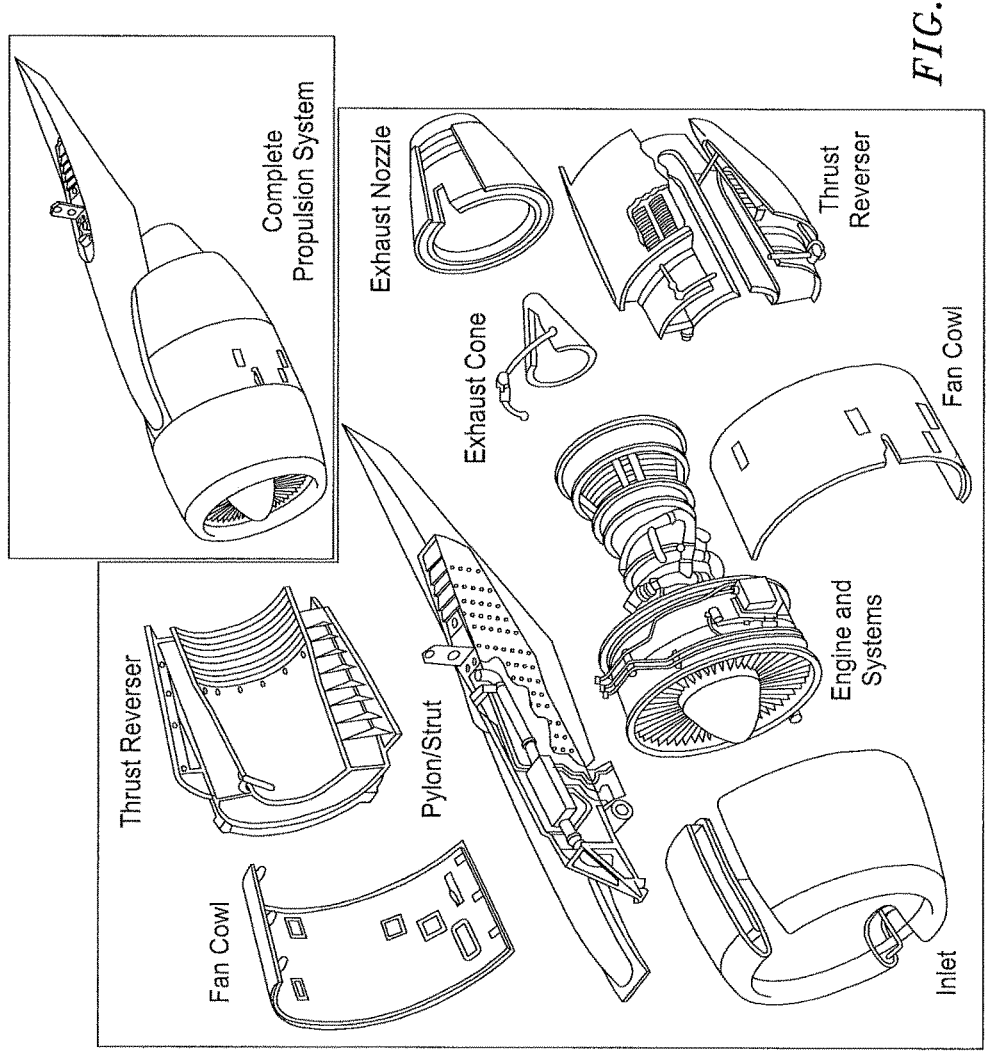
FIG. 1 is a schematic diagram representing a typical nacelle system.
Figure 2:
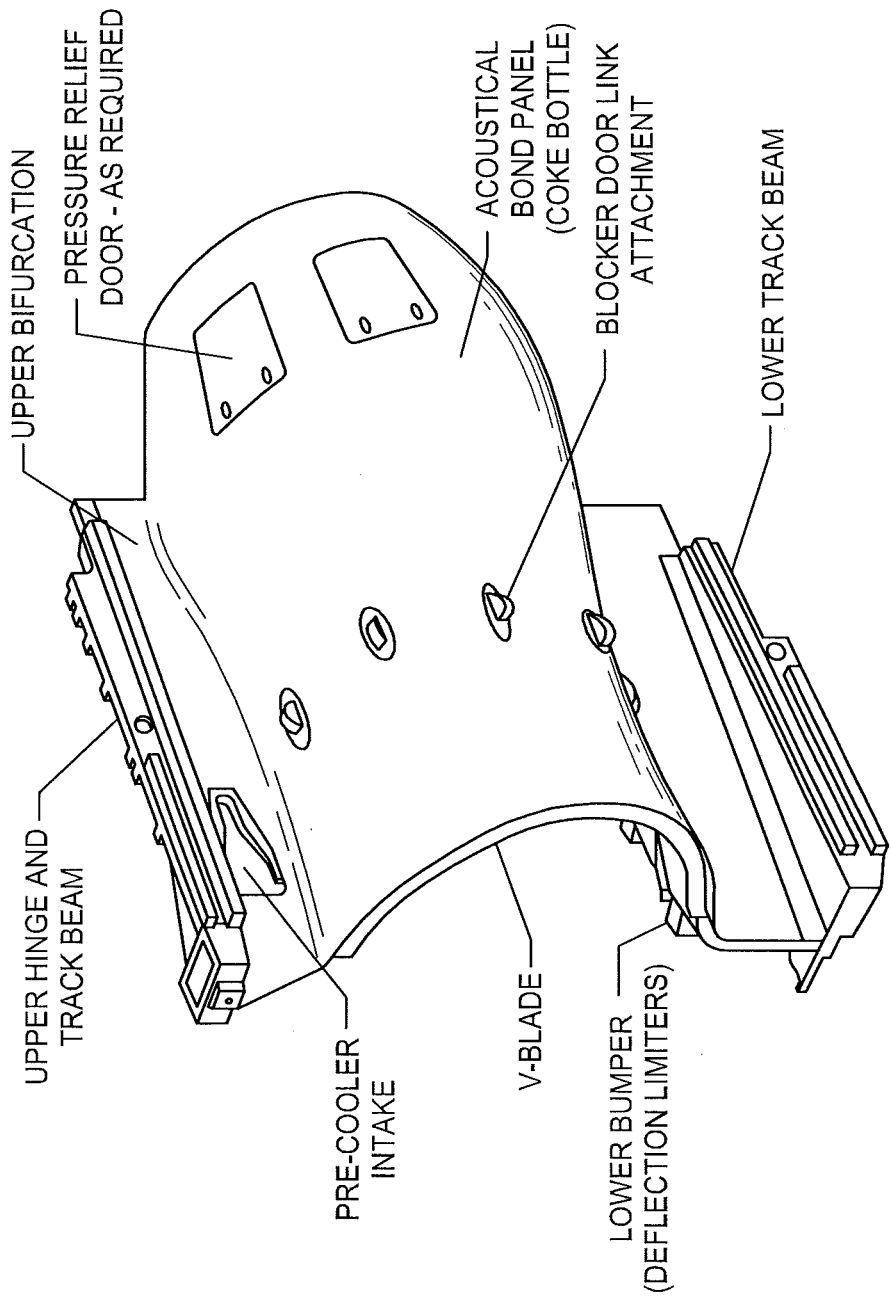
FIG. 2 is a schematic diagram representing a typical IFS half.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for making and using a nacelle. In some embodiments, an IFS half is constructed from an all titanium, barrel shaped bottle section, and separately formed bifurcation wings which may be constructed from composites or other materials (e.g., aluminum).

Figure 3:
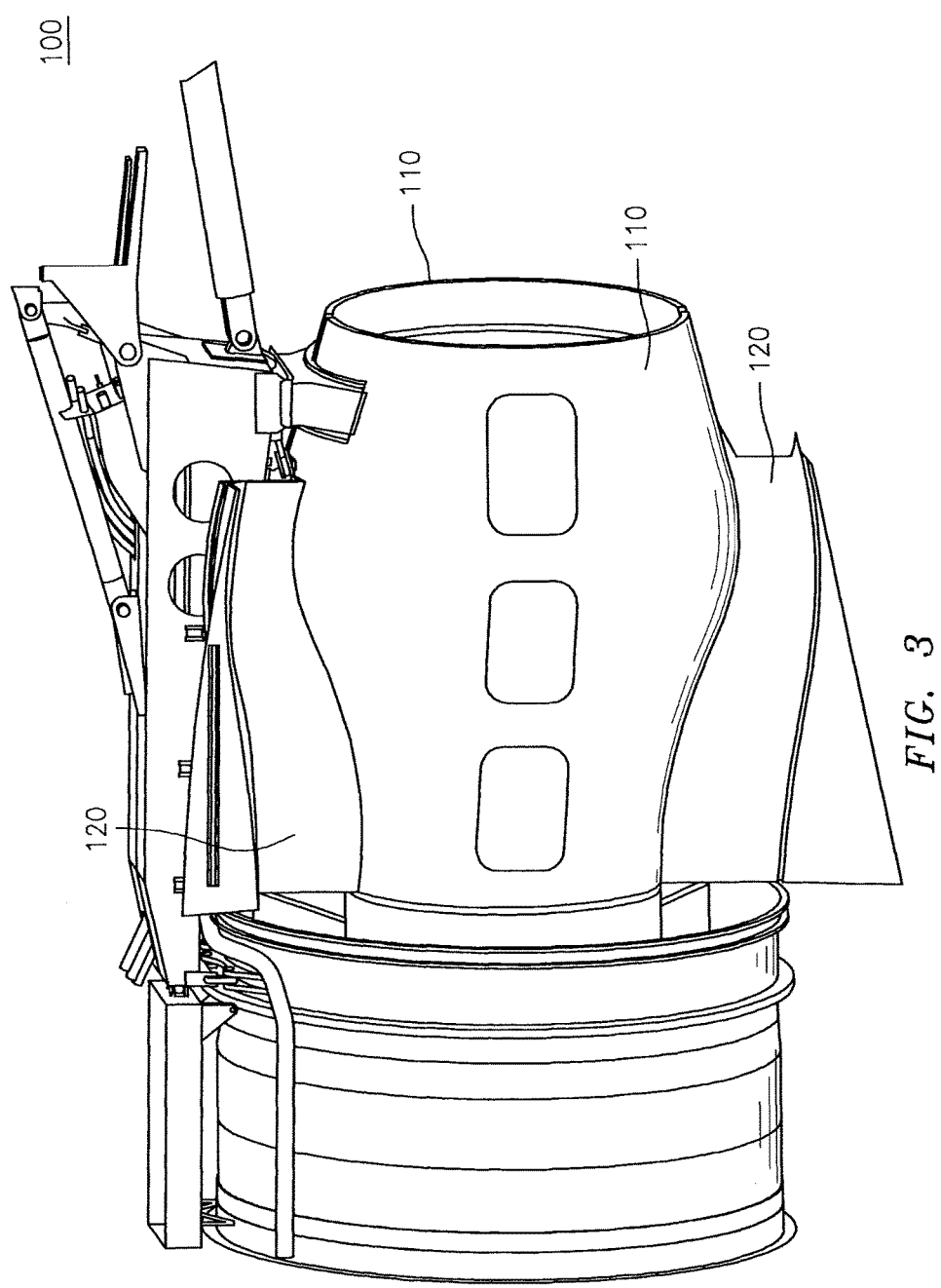
FIG. 3 is an illustration of an IFS according to the principles of the present disclosure.

FIG. 3 illustrates an IFS 100 with a titanium bottle section 110 and separately formed bifurcation halves 120.

The titanium bottle section 110 may be a bonded structural panel formed from a titanium (solid) inner skin, a titanium hexagonal (or other shape) honeycomb core, and a titanium (perforated) outer skin, all bonded together in a known manner through an appropriate process such as welding, brazing or liquid interface diffusion bonding. This bonded panel can be formed in a complete 360° barrel shape, if desired. This effectively makes at least two bottle sections 110 which can be separated from one another after the barrel shape is fully bonded.

The separate bifurcation panels 120 may be formed as composite bonded panels, with carbon fiber reinforced epoxy inner and outer skins bonded to a hexagonal (or other shape) honeycomb core in the center to form a strong, lightweight structure in a known manner. In some embodiments, one or more outer skins are perforated.

Figure 4:
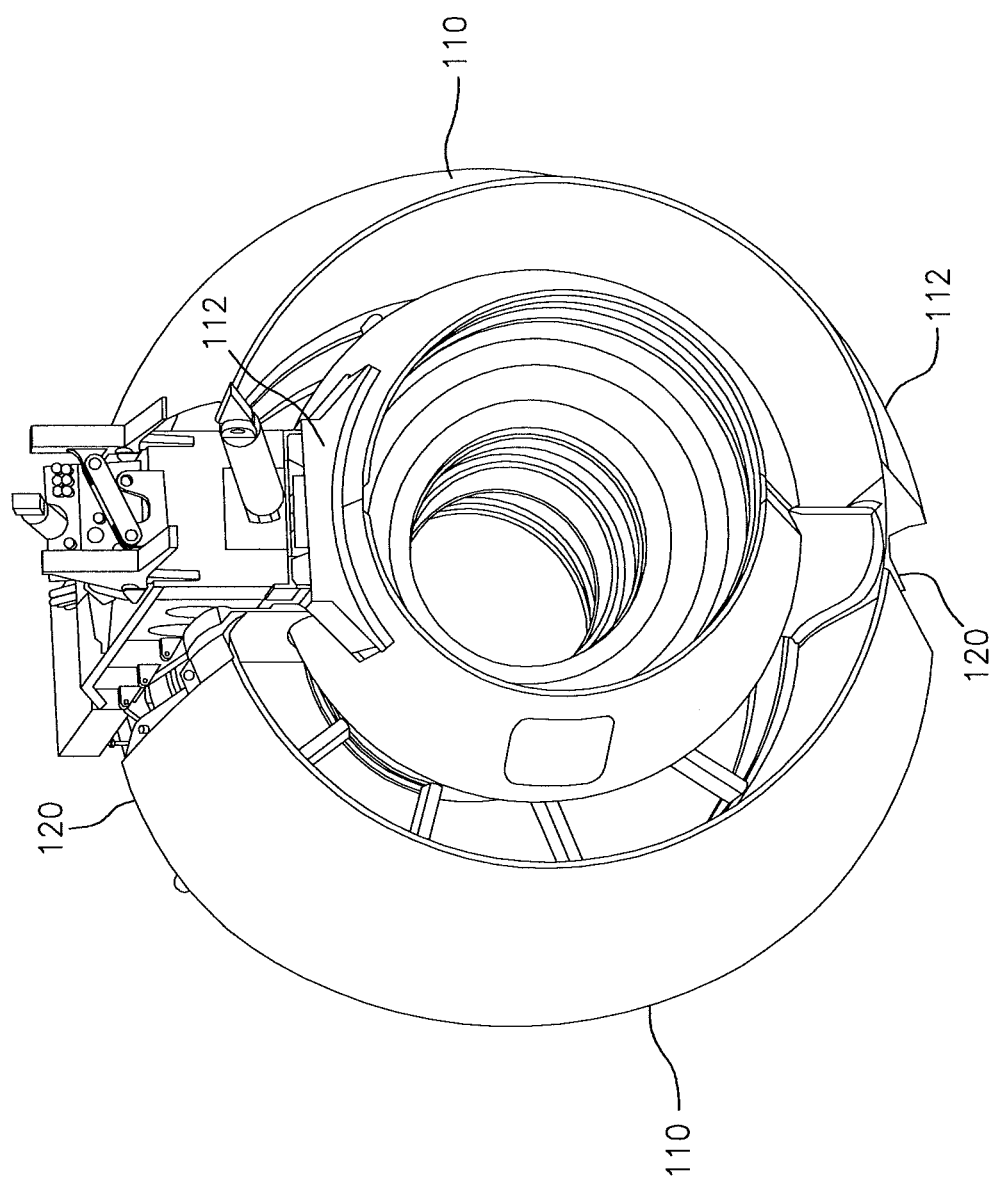
FIG. 4 is an additional view of the IFS of FIG. 3.

The bottle sections 110 fit together so that they form a generally sealed fire chamber around the engine core, as shown in FIG. 4. The bottle sections 110 fit together at joints 112. Fire seals (not shown in FIG. 4) are fit in these joints 112 to create a sealed environment around the engine core that prevents any fire or hot gases from escaping and spreading. The bottle sections 110 may be fastened or clamped to one another to support the sudden increase in internal pressure conditions that may occur if a duct around the engine core bursts. In this respect, the bottle sections 110 may act as a pressure vessel.

Penetrations may be provided through the bottle sections 110 to bring ducts, wires, harnesses, tubes, and engine support structures through the bottle sections 110 and to the engine core. One or more of these penetrations may be sealed to maintain a sealed environment inside the two joined bottle sections 110. Provisions may be added to provide pressure relief of an over pressurized engine core compartment.

Because the bottle sections 110 define and form the chamber around the engine core, the bifurcation panels are not exposed to the high temperature environment around the engine core, and can be made from the previously described composite panels without any heat blanket protection.

The all-titanium bottle sections 110 can withstand the high heat of the engine core environment, and the large thermal gradient from inside to out, and do not require a heat blanket.

The bottle sections 110 may be configured to minimize/reduce a transfer of loads to the bifurcation panels 120 and one or more beams (examples of the beams are described further below). If the loads imposed on the bifurcations panels 120 and beams can be reduced, then the bifurcation panels 120 and beams can be made smaller in size/dimension, resulting in a reduction in terms of the weight of the bifurcation panels 120 and beams.

The bifurcation panels 120 may be joined after separately forming to the bottle sections 110. Or, the bifurcation panels 120 may only press against and seal against the outside surface of the bottle sections 110, and instead be mounted to and supported by other structure such as the pylon or the outer fixed structure of the thrust reverser.

Figure 5A:
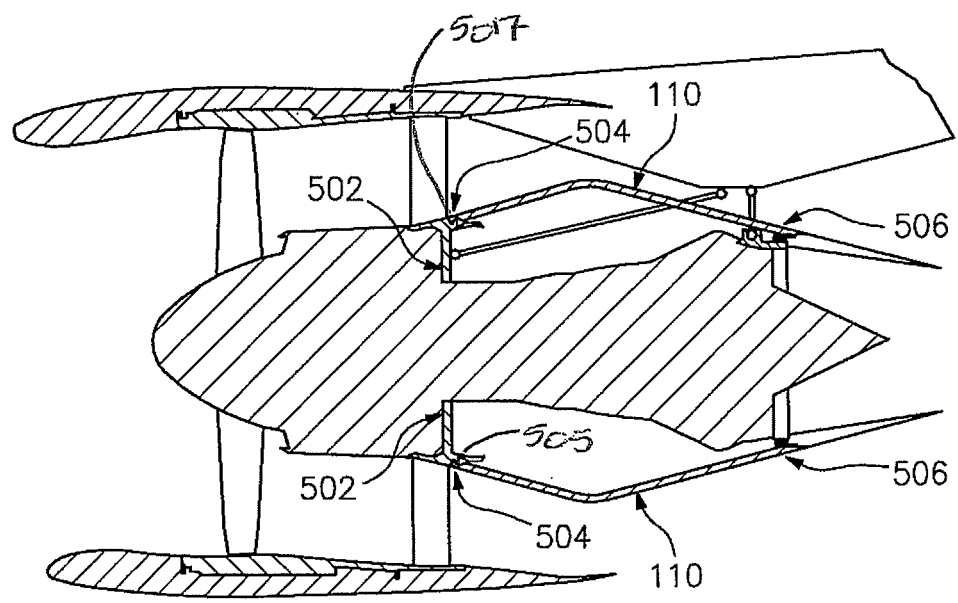
FIGS. 5A-5B illustrate exemplary embodiments for attaching an IFS to an engine.

The use of bifurcation panels 120 that are separate from the bottle sections 110 may alleviate stress concentrations that occur due to the bottle sections 110 wanting to thermally grow axially more than the bifurcation panels 120. FIG. 5A represents a first technique/option for attachment, wherein the titanium barrel/bottle sections 110 are attached to a fan case 502 of an engine via attachment means 504 at the forward end. The attachment means 504 may include a v-blade 505/v-groove 507, a bolted joint, a pin-latch in connection with a hinge, etc. Aft, floating snubbers/standoffs 506 concentric to the engine axis are used for coupling the bottle sections 110 to the engine, without attaching the bottle sections 110 to the aft of the engine. This lack of aft attachment allows for the thermal growth described above.

Figure 5B:
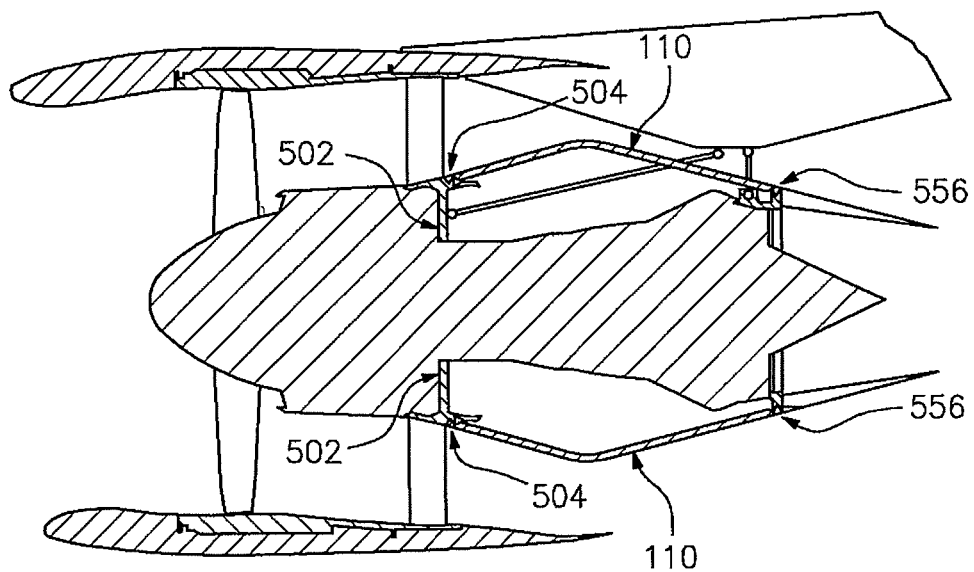

FIG. 5B represents a second technique/option for attachment. This second technique is similar to the technique used in FIG. 5A, but in lieu of using the snubbers/standoffs 506 a second attachment means 556 is used aft to attach the bottle sections 110 to the engine. The attachment means 556 may include, or correspond to, the attachment means that may be used in connection with the attachment means 504 described above. While the second technique depicted in FIG. 5B might not be as readily applicable to enabling thermal growth as the first technique of FIG. 5A, the components and devices may grow to the same extent (within an order of magnitude) due to being located in the same proximity to one another such that incorporating mechanisms to accommodate thermal growth might not be needed. The second technique depicted in FIG. 5B may facilitate load sharing between the bottle sections 110 and the engine core, such that the bottle sections 110 can be viewed/treated as an exoskeleton to the engine core. This effect may be particularly pronounced in connection with engines/engine cores that are following the trend of having smaller engine cores relative to the fan diameter and therefore are less stiff and more susceptible to bending.

FIGS. 6A-6E illustrate various embodiments for interfacing/coupling the bifurcation panels 120 to beams. These embodiments are described in further detail below.

Figure 6A:
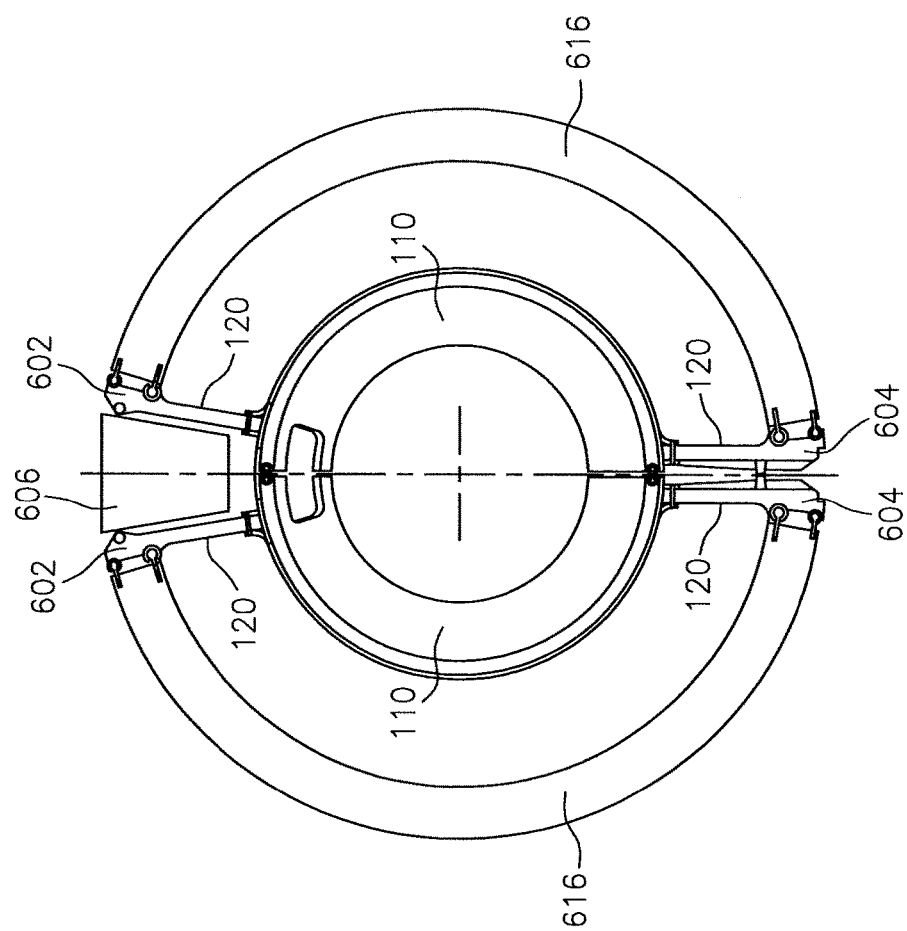
FIGS. 6A-6E illustrate exemplary embodiments for interfacing/coupling one or more bifurcation panels to one or more beams.

In FIG. 6A, the upper bifurcation panels 120 are integral to (e.g., blended with) a (composite) hinge beam 602.

Similarly, the lower bifurcation panels 120 are integral to (e.g., blended with) a (composite) latch beam 604. As such, the upper bifurcation panels 120 are of the same (composite) material as the hinge beam 602 and the lower bifurcation panels 120 are of the same (composite) material as the latch beam 604. Also, as shown in FIG. 6A the hinge beam 602 may be coupled to a pylon 606 (or other structure).

Figure 6B:
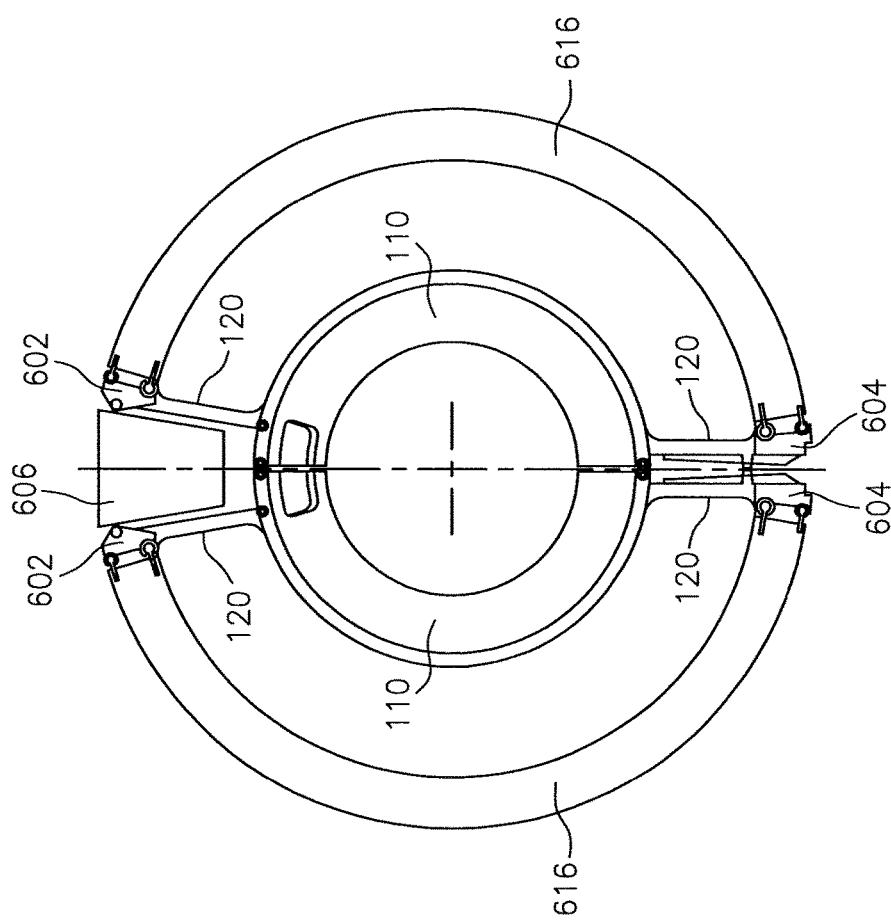

In FIG. 6B, the upper bifurcation panels 120 are fastened or bolted to the hinge beam 602. Similarly, the lower bifurcation panels 120 are fastened or bolted to the latch beam 604. Thus, unlike in FIG. 6A where the bifurcation panels 120 are integral with the beams 602 and 604, in FIG. 6B the bifurcation panels 120 may be made of materials (e.g., composite) that are different from the materials of the beam 602 and/or the beam 604.

Figure 6C:
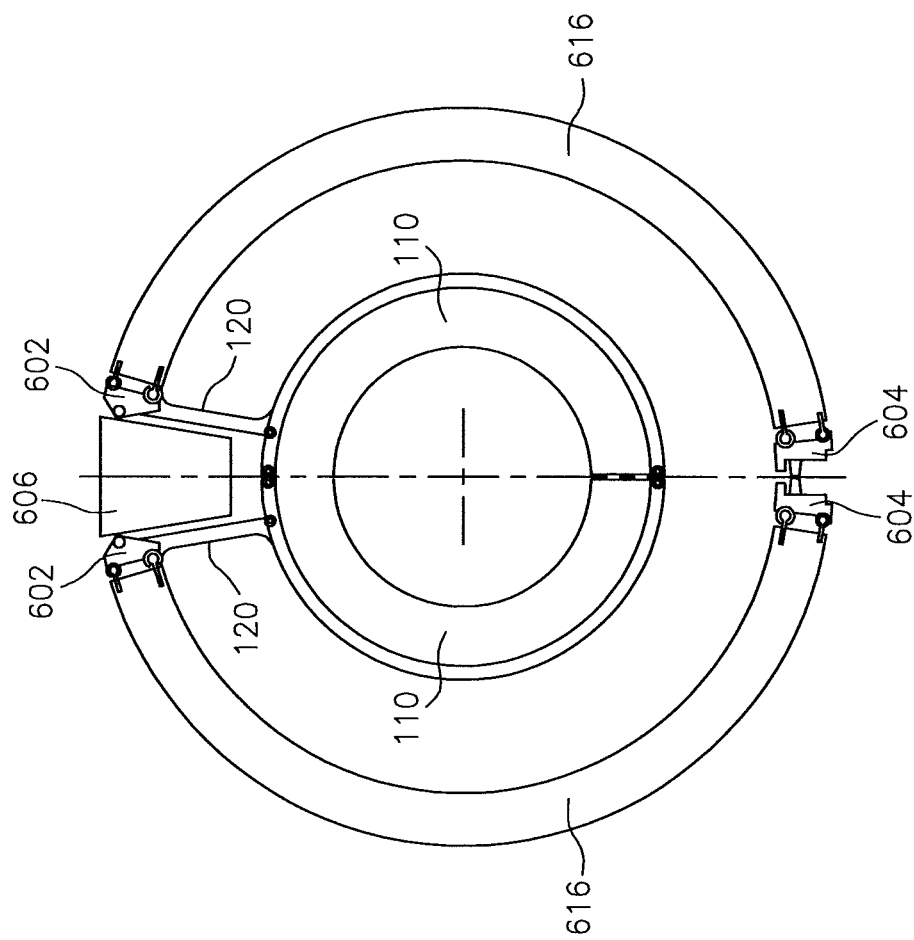

FIG. 6C represents a configuration that may be referred to as an O-duct, wherein relative to the embodiments of FIGS. 6A-6B in FIG. 6C the lower bifurcation panels 120 are omitted. In FIG. 6C, the interface between the upper bifurcation panels 120 and the hinge beam 602 may adhere to the integrated configuration of FIG. 6A or the fastening of FIG. 6B.

Figure 6D:
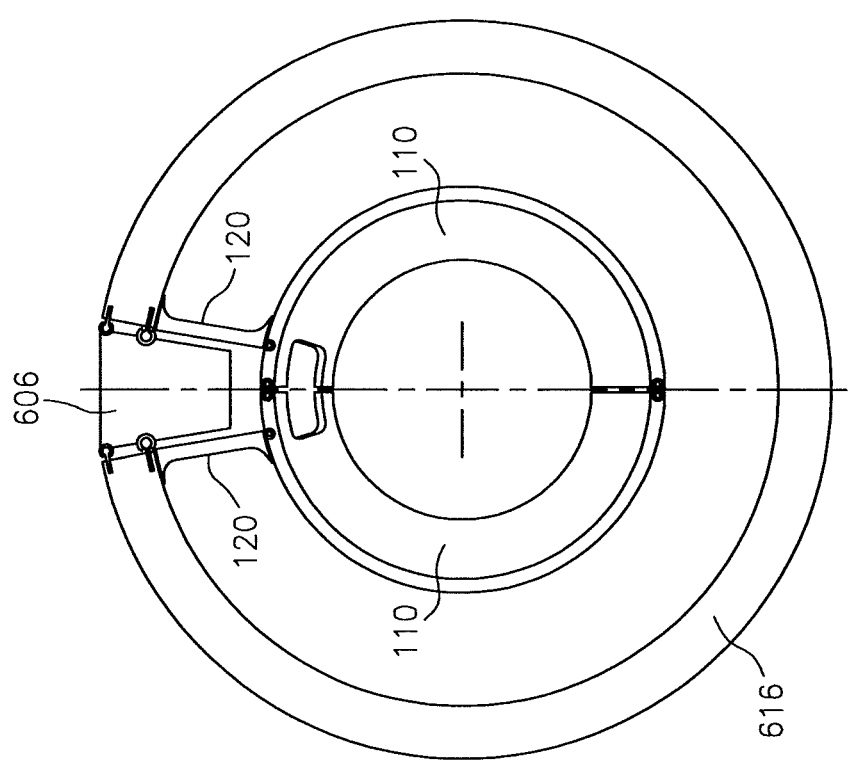

In FIG. 6D, an O-duct similar to FIG. 6C is shown. However, whereas the embodiment/configuration of FIG. 6C (and FIGS. 6A-6B) includes a rotatable/hinged duct wall 616, in FIG. 6D the duct wall 616 is a single piece translatable in a forward or aft direction.

Figure 6E:
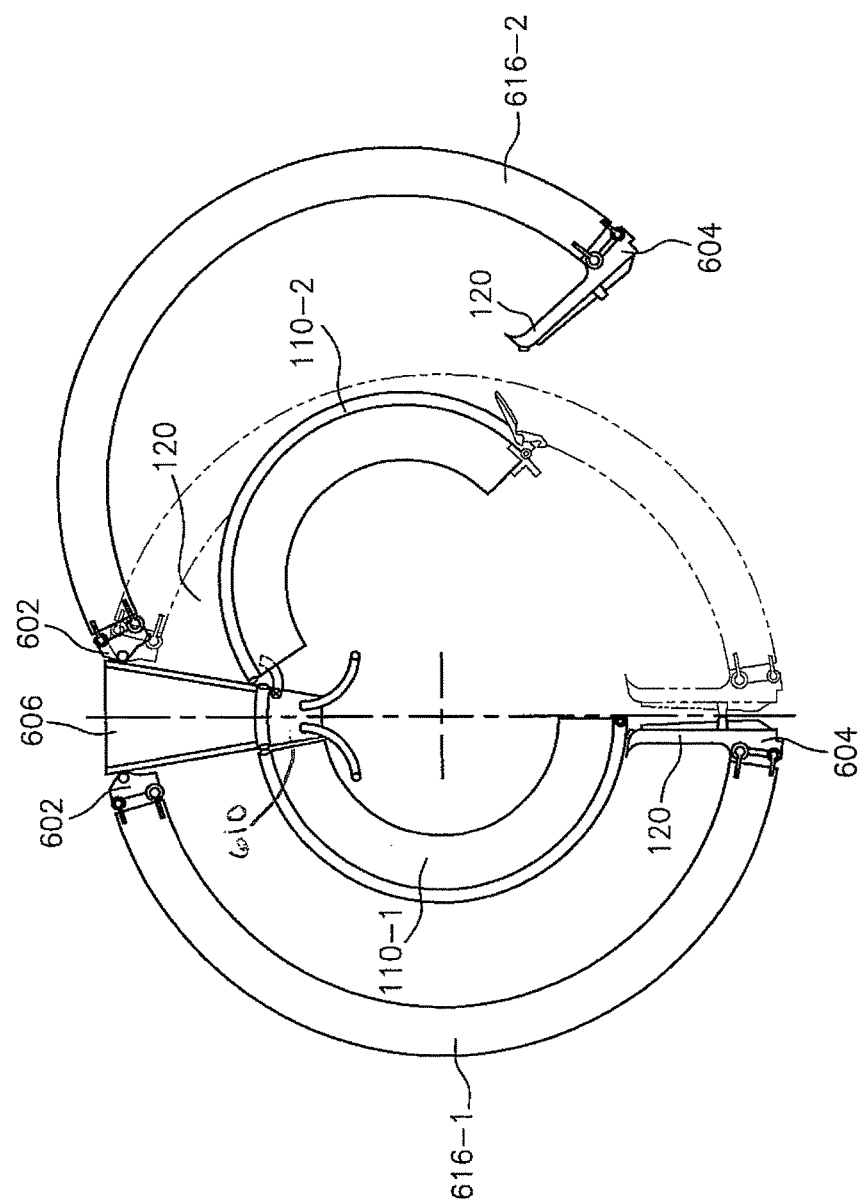

In some embodiments, the upper bifurcation panels 120 can become an extension of the pylon 606. Thus, similar to FIG. 6A where the bifurcation panels 120 were made integral with the beams 602 and/or 604, in FIG. 6E the upper bifurcation panels 120 can be made integral with the pylon 606. In FIG. 6E, a first of the bottle sections 110 is denoted as 110-1 and a second of the bottle sections 110 is denoted as 110-2.

The embodiment of FIG. 6E is shown as including a support structure 610. The role and function of such a support structure is described further below.

FIGS. 7A-7D illustrate various embodiments for interfacing/coupling a first of the bottle sections 110-1 to a second of the bottle sections 110-2. These embodiments are described in further detail below.

Figure 7A:
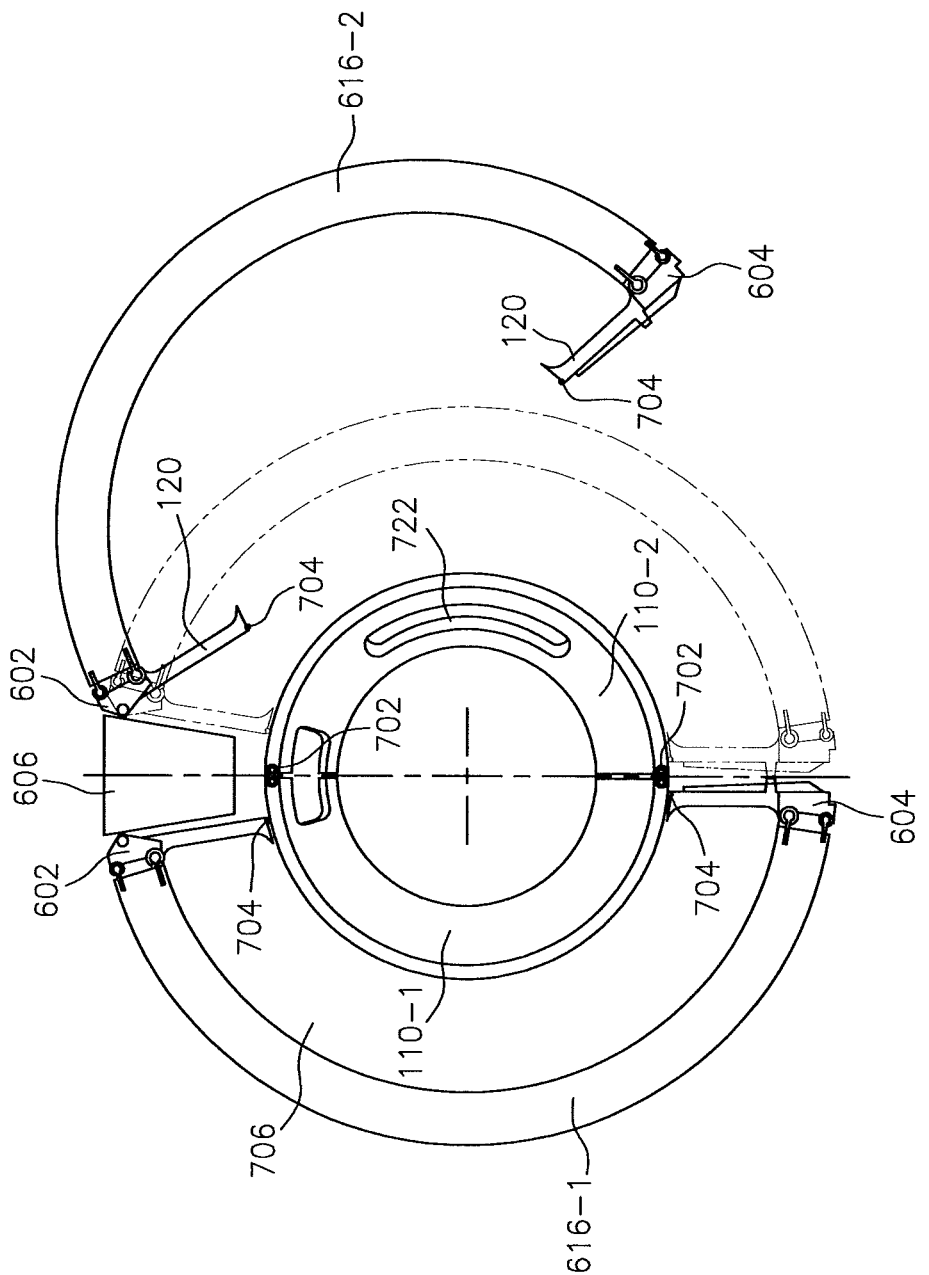
FIGS. 7A-7D illustrate exemplary embodiments for coupling and decoupling bottle sections of an IFS from one another.

In FIG. 7A, the first bottle section 110-1 and the second bottle section 110-2 each contribute 180° of the overall 360° barrel shape and are joined at the top and bottom along a common center line. Where the sections 110-1 and 110-2 are joined at the centerline, fire seals 702 may be provided to ensure that any fire or high pressure condition within the engine is contained within the bottle sections 110. Similarly, at the interface points 704 between the bifurcation panels 120 and the sections 110-1 and 110-2, performance seals may be provided in order to maintain an air flow or pressure within a duct 706 (e.g., an engine fan duct) formed between the duct wall 616 (denoted as duct wall sections 616-1 and 616-2 in FIG. 7A) and the sections 110-1 and 110-2.

In FIG. 7A, the duct wall section 616-2 is shown in an open position, which may facilitate access to systems associated with the pylon 606, the sections 110-1 and 110-2, or the engine housed within the sections 110-1 and 110-2. In this respect, the section 110-1 and/or the section 110-2 may include one or more access panels 722. The access panel 722 may be sized or located to provide access to one or more components of the engine housed within the bottle sections 110. The location or size of the access panel 722 may be selected so as to provide access to components of the engine that are deemed to be critical or have a tendency to require a high degree of service/maintenance. Accordingly, the access panel 722 may be used to enable access to the engine components without having to separate the sections 110-1 and 110-2 from one another.

Figure 7B:
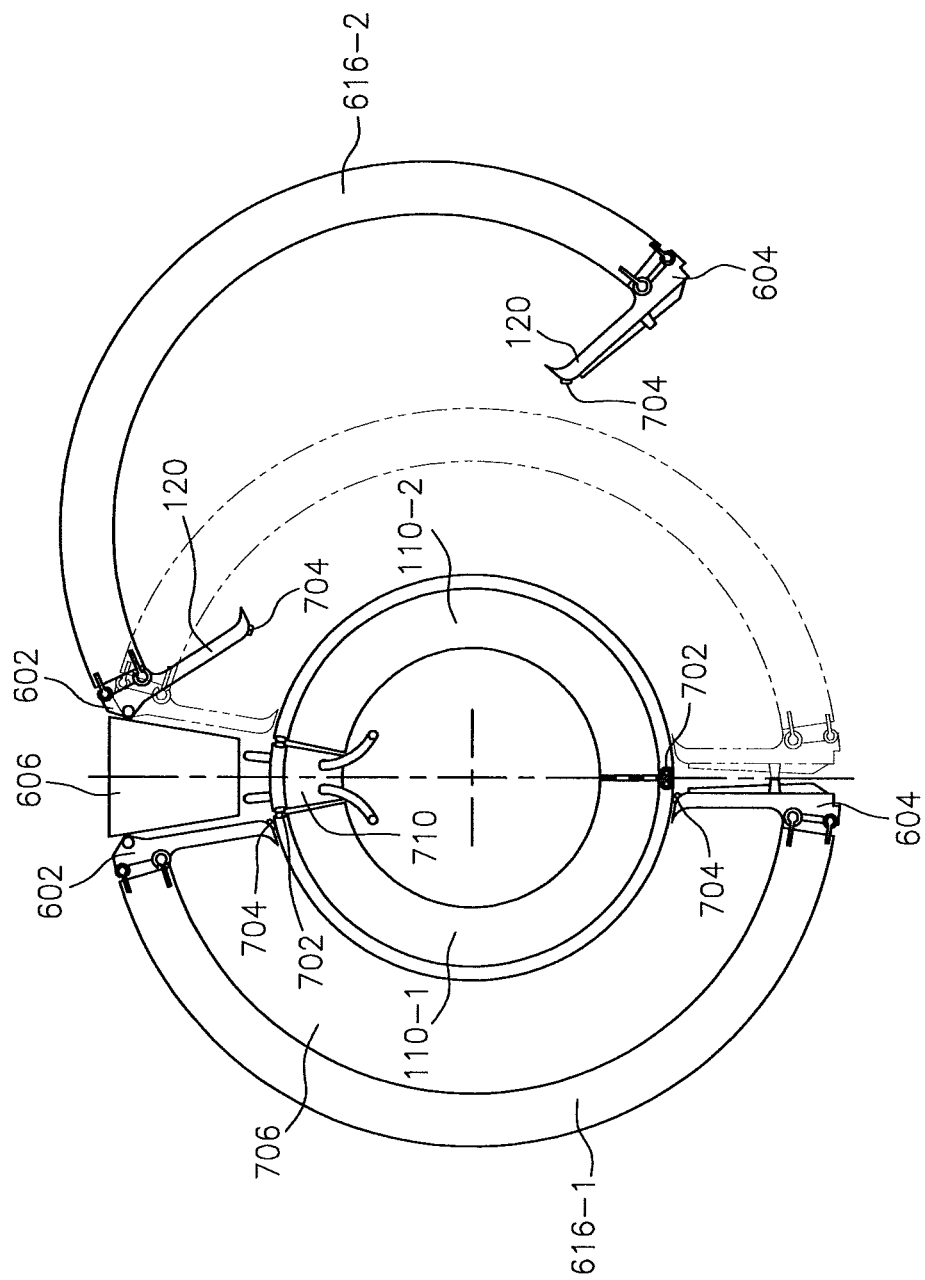

In FIG. 7B, the sections 110-1 and 110-2 are shown as being joined about a common center-line at the bottom. However, instead of joining together at the top as in FIG. 7A, the sections 110-1 and 110-2 are coupled (e.g., attached) to an apron/island/support structure 710 (which may correspond to the support structure 610 of FIG. 6E). Thus, in FIG. 7B the barrel is formed from at least three sections/pieces (e.g., sections 110-1, 110-2, and support structure 710). Unlike the embodiment of FIG. 7A, in the embodiment of FIG. 7B the sections 110-1 and 110-2 may contribute less than 180° of the 360° barrel shape.

The support structure 710 may correspond to an offset of the actual floor of the pylon 606, such that the support structure 710 may be manufactured/assembled when manufacturing/assembling the pylon. Alternatively, the support structure 710 may be manufactured as part of the manufacturing of the sections 110-1 and 110-2. Irrespective of how the support structure 710 is manufactured, the support structure 710 may ultimately form a part of or be fixed to the pylon 606. In this manner, any loads generated by other portions of the aircraft that end up getting translated into the pylon 606 might not impact the sections 110-1 and 110-2 (or vice versa). Also, the support structure 710 may represent a fixed support structure/frame of reference for purposes of assembling or removing the sections 110-1 and 110-2 including fixed and hinged joints.

The support structure 710 may be used as bulkhead to pass ducts, wires, harnesses, tubes, and engine support structures through the bottle sections 110 and to the engine core.

Figure 7C:
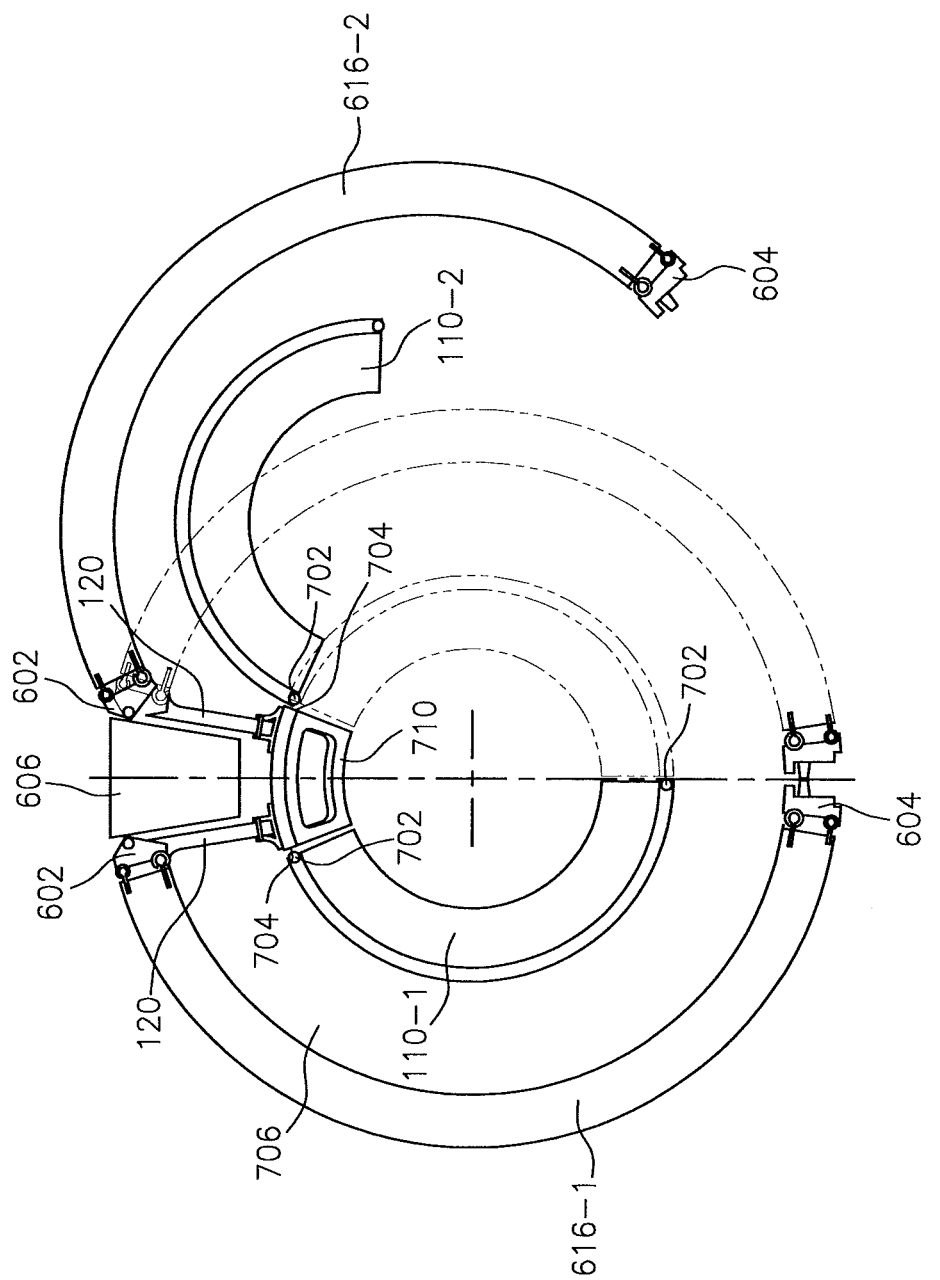

In FIG. 7C, the section 110-2 is shown as being pivotally rotated about the support structure 710 (potentially via a hinge and/or pin). Furthermore, in FIG. 7C the upper bifurcation panels 120 are located within the span of the support structure 710 and do not move with the duct wall sections 616-1 or 616-2 when the duct wall sections 616-1 or 616-2 are opened/rotated (unlike the embodiment of FIG. 7B). In this respect, the embodiment of FIG. 7C is similar to the embodiment of FIG. 6E (wherein the upper bifurcation panels 120 are integrated with the pylon 606).

Figure 7D:
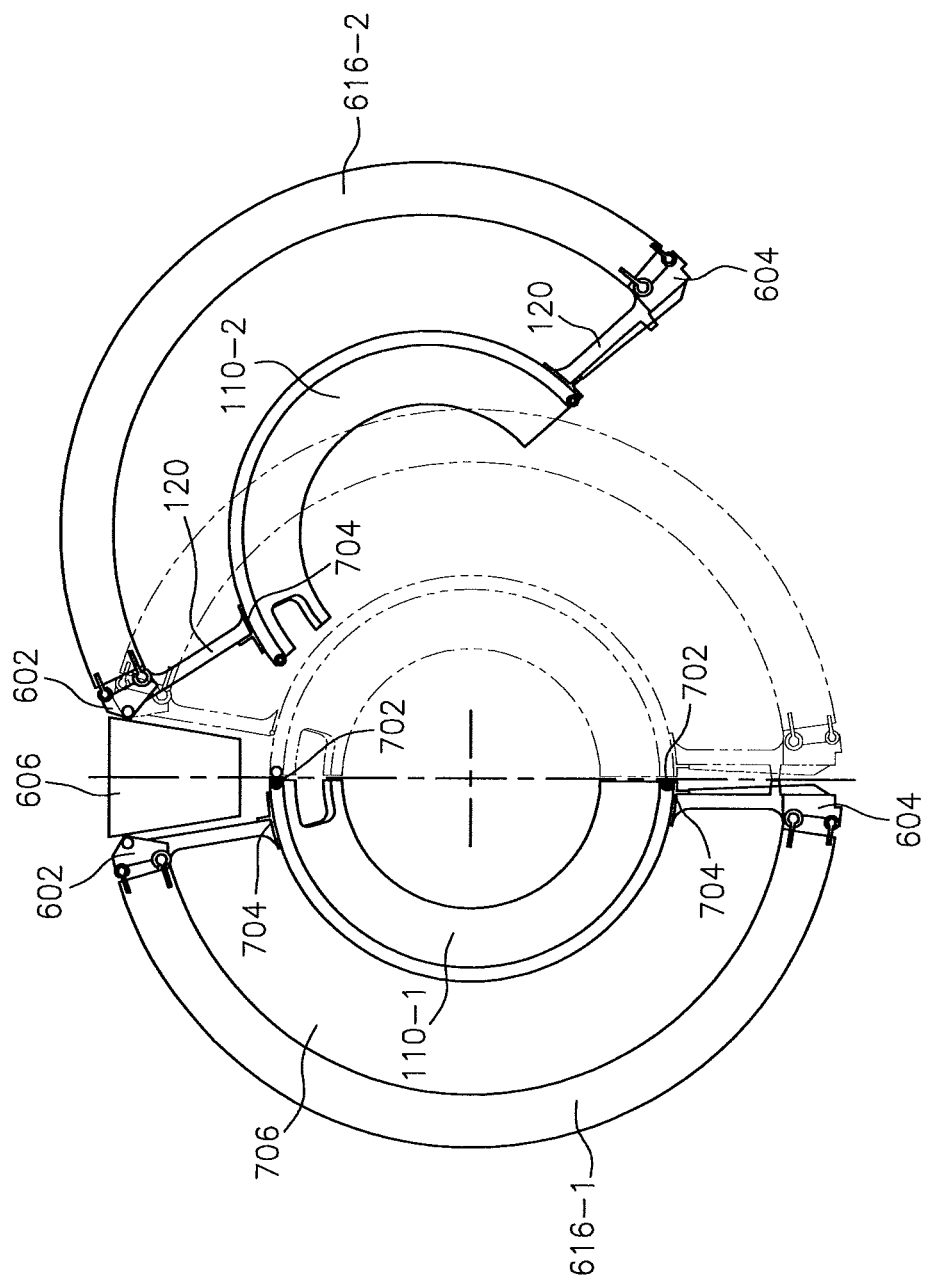

In FIG. 7D, the bifurcation panels 120 are coupled (e.g., attached) to the bottle sections 110-1 and 110-2 and the duct wall sections 616-1 and 616-2. Thus, the sections 110-1 and 110-2 may swing open when the duct wall sections 616-1 and 616-2 are swung open, respectively. The sections 110-1 and 110-2 may include cutouts or grommets for engine connections to pass through.

In FIGS. 7A-7D, one or more attachment means may be used to attach the sections 110-1 and 110-2 to one another, or to attach the section 110-1 and/or the section 110-2 to another component/device (e.g., the support structure 710). Such attachment means may include fasteners, latches, hinges, pins, etc. When the sections are attached via the attachment means, the sections may be used to accommodate hoop stress, such as hoop stress based on an over pressure condition.

Technical effects and benefits of the disclosure include a reduction in terms of weight and associated cost of an IFS via the use of a titanium bottle section 110 (or sub-sections 110-1 and 110-2) coupled to one or more additional components (e.g., bifurcation panels 120) made of a material that is different from titanium (e.g., a composite material, aluminum, etc.) Any loads generated by, e.g., an engine housed in the bottle section 110 may be transferred spanwise/axially along the bottle section 110, allowing the size/weight of the bifurcation panels 120 and beams 602, 604 to be minimized/reduced. Accordingly, a design may be realized that minimizes weight/cost while still providing structural and functional integrity.

While aspects of the disclosure have been described in terms of various discrete embodiments for purposes of illustrative convenience, it is understood that one or more aspects of a first embodiment may be combined with one or more additional aspects of one or more additional embodiments. All such variations and modifications are within the scope and spirit of this disclosure.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

We claim:

1. A system for an aircraft comprising:
A titanium bottle section that includes a plurality of sections configured to house and form a sealed fire chamber around an engine, each of the sections comprising titanium; and
at least one bifurcation panel coupled to the bottle section, wherein the at least one bifurcation panel includes a material that is different from titanium; and
wherein each of the plurality of bottle sections is disposed adjacent and movable relative to a respective one of the at least one of the bifurcation panels.

2. The system of claim 1, further comprising:
at least one v-blade configured to couple the bottle section and the engine at a forward end of the engine.

3. The system of claim 2, further comprising one of:
at least one standoff configured to couple the bottle section and the engine at an aft end of the engine; and
at least a second v-blade configured to couple the bottle section and the engine at the aft end of the engine.

4. The system of claim 1, further comprising:
at least one beam coupled to the at least one bifurcation panel.

5. The system of claim 4, wherein the at least one beam is integral with the at least one bifurcation panel.

6. The system of claim 4, wherein the at least one beam is a hinge beam.

7. The system of claim 1, further comprising:
a duct wall configured as a single piece that is translatable in at least one of a forward direction or an aft direction.

8. The system of claim 1, further comprising:
a pylon coupled to the at least one bifurcation panel and integral with the at least one bifurcation panel.

9. The system of claim 1, wherein the titanium bottle section is two sections that form a 360° barrel shape when coupled to one another.

10. The system of claim 1, wherein the titanium bottle section is at least three sections that form a 360° barrel shape when coupled to one another.

11. The system of claim 10, wherein a first of the at least three sections is configured to couple to a pylon.

12. The system of claim 11, wherein the first of the at least three sections is configured to enable at least one of a duct, a wire, a harness, a tube, and an engine support structure to pass through the first of the at least three sections.

13. The system of claim 10, wherein the at least one bifurcation panel is located within a span of a first of the at least three sections.

14. The system of claim 1, wherein the at least one bifurcation panel is attached to the bottle section.

15. The system of claim 1, wherein the at least one bifurcation panel includes a composite material, and wherein the bottle section is configured to transfer loads generated by the engine axially along the bottle section.

16. The system of claim 1, wherein each section comprises a titanium cellular core between a pair of titanium skins, and the bifurcation panel comprises a cellular core between a pair of skins.

17. A system for a propulsion system of an aircraft, the propulsion system comprising an engine core and a nozzle, the system comprising:
an inner fixed structure including a titanium bottle section, a first bifurcation panel and a second bifurcation panel;
the titanium bottle section including first and second titanium sections, and the titanium bottle section configured to extend circumferentially about and house the engine core upstream of the nozzle, the first titanium section disposed adjacent and movable relative to the first bifurcation panel, and the second titanium section disposed adjacent and movable relative to the second bifurcation panel;
wherein the first bifurcation panel comprises a material that is different from titanium.

18. The system of claim 17, wherein the material is a composite material.

19. The system of claim 17, wherein the material comprises fiber reinforcement within a resin matrix.

20. The system of claim 17, wherein the material comprises carbon fiber.

* * * * *